United States Patent
Elliston et al.

(10) Patent No.: US 12,076,802 B2
(45) Date of Patent: Sep. 3, 2024

(54) ACCESSORIES FOR OSCILLATING POWER TOOLS

(71) Applicant: BLACK & DECKER INC., New Britain, CT (US)

(72) Inventors: Asif Elliston, East Longmeadow, MA (US); Kevin Howe, Ludlow, MA (US); Kenneth Hall, East Longmeadow, MA (US); Stephen A Hampton, East Longmeadow, MA (US); Mark T. Cranna, Somers, CT (US); Jared Theodore Strand, Wilbraham, MA (US)

(73) Assignee: BLACK & DECKER INC., New Britain, CT (US)

( * ) Notice: Subject to any disclaimer, the term of this patent is extended or adjusted under 35 U.S.C. 154(b) by 79 days.

(21) Appl. No.: 17/648,190

(22) Filed: Jan. 18, 2022

(65) Prior Publication Data

US 2022/0234124 A1   Jul. 28, 2022

Related U.S. Application Data

(60) Provisional application No. 63/140,581, filed on Jan. 22, 2021.

(51) Int. Cl.
*B23D 61/00*      (2006.01)
*B27B 19/00*      (2006.01)
*B25F 3/00*       (2006.01)

(52) U.S. Cl.
CPC .............. *B23D 61/006* (2013.01); *B25F 3/00* (2013.01); *B27B 19/006* (2013.01)

(58) Field of Classification Search
CPC .... B23D 61/006; B23D 61/12; B23D 61/121; B23D 61/123; B27B 19/006; B27B 19/008
See application file for complete search history.

(56) References Cited

U.S. PATENT DOCUMENTS 5,241,886 A  *  9/1993  Church ................... B26D 7/12
                                              83/306
5,569,257 A    10/1996  Arnegger et al.
(Continued)

FOREIGN PATENT DOCUMENTS

CH           703107 A1 * 11/2011  ........... B23D 61/006
CN        102423816 A     4/2012
(Continued)

OTHER PUBLICATIONS

Extended European Search Report, EP Application No. 22152373.1, Jun. 9, 2022, 41 pages, EPO.
(Continued)

*Primary Examiner* — Jennifer S Matthews
(74) *Attorney, Agent, or Firm* — Scott B. Markow

(57) ABSTRACT

An accessory for oscillating power tools includes an attachment portion with a rear end couplable to an oscillating power tool and a working portion coupled to the attachment portion and extending along a tool axis. The working portion includes a cutting edge arranged asymmetrically relative to the tool axis with a leading tooth disposed at one end of the cutting edge at a first distance from the rear end, a trailing tooth disposed on an opposite end of the cutting edge at a second distance from the rear end that is less than the first distance, and a plurality of intermediate teeth between leading tooth and the trailing tooth, each disposed less than or equal to the first distance and greater than or equal to the second distance from the rear end, the cutting edge slanted at an acute angle to a line perpendicular to the tool axis.

16 Claims, 11 Drawing Sheets

(56) References Cited

U.S. PATENT DOCUMENTS

| | | | |
|---|---|---|---|
| 7,527,628 | B2 | 5/2009 | Fletcher et al. |
| 7,901,424 | B2 | 3/2011 | Fletcher et al. |
| 7,998,158 | B2 | 8/2011 | Fletcher et al. |
| 8,568,204 | B2 | 10/2013 | Steiger et al. |
| 8,920,424 | B2 | 12/2014 | Boykin |
| 9,414,845 | B2 | 8/2016 | Boykin |
| 9,522,432 | B2 | 12/2016 | Staub |
| 10,016,904 | B2 | 7/2018 | Jones |
| 10,112,294 | B2 | 10/2018 | Fuchs |
| 10,245,744 | B2 | 4/2019 | Morcos |
| 10,512,978 | B2 | 12/2019 | Rubens |
| 10,549,435 | B2 | 2/2020 | Padget |
| 10,568,637 | B2 | 2/2020 | Koljaka et al. |
| 10,792,740 | B2 * | 10/2020 | Karlen ............... B23D 61/006 |
| 10,799,968 | B2 | 10/2020 | Bozic |
| 10,953,563 | B2 | 3/2021 | Morcos |
| 2001/0041524 | A1 | 11/2001 | Steiger et al. |
| 2002/0104421 | A1 | 8/2002 | Wurst |
| 2002/0116023 | A1 | 8/2002 | Hasbrouck et al. |
| 2010/0288099 | A1 | 11/2010 | Steiger |
| 2012/0144676 | A1 | 6/2012 | Davidian et al. |
| 2015/0020671 | A1 | 1/2015 | Meindorfer |
| 2015/0096422 | A1 * | 4/2015 | Stoddart ............. B23D 61/021 83/835 |
| 2015/0165633 | A1 | 6/2015 | Padget |
| 2021/0154877 | A1 | 5/2021 | Morcos |
| 2021/0229198 | A1 | 7/2021 | Reist et al. |

FOREIGN PATENT DOCUMENTS

| | | | | |
|---|---|---|---|---|
| DE | 202013004984 U1 | * | 6/2014 | ........... B23D 61/006 |
| EP | 3213847 A1 | * | 9/2017 | ........... B23D 61/006 |
| GB | 476201 A | * | 12/1937 | |
| GB | 2387350 A | * | 10/2003 | ........... B23D 61/121 |
| WO | 2013/113432 A1 | | 8/2013 | |
| WO | 2013/131675 A1 | | 9/2013 | |
| WO | WO-2016132320 A1 | * | 8/2016 | |
| WO | 2018/036061 A1 | | 3/2018 | |
| WO | WO-2021146511 A1 | * | 7/2021 | ........... B23D 61/006 |

OTHER PUBLICATIONS

Amazon, "Norske Tools NOTP217 Oscillating Multi Tool Accessory Blade Universal Fit for Drywall Cutting," 2022, 10 pages, Retrieved from the Internet on Jan. 7, 2022 at URL: <amazon.com/Norske-NOTP217-Oscillating-Accessory-Universal/dp/B08785P3GH?th=1>.

* cited by examiner

ACCESSORIES FOR OSCILLATING POWER TOOLS

RELATED APPLICATION

This application claims priority, under 35 U.S.C. § 119(e) to U.S. Provisional Application No. 63/140,581, filed Jan. 22, 2021, titled "Accessories for Oscillating Power Tools," which is incorporated by reference.

TECHNICAL FIELD

This application relates to accessories (such as cutting tools and saw blades) for oscillating power tools.

BACKGROUND

Oscillating power tools generally have a motor, an output shaft, and a transmission that connects the motor to the output shaft and converts rotary motion of the motor to oscillating motion of the output shaft. The output shaft is coupled to an accessory attachment mechanism that is used to removably attach various types of accessories, such as cutting tools, saw blades, and sanding tools, to the output shaft. It is desirable to have oscillating accessories for performing variety of tasks.

SUMMARY

In an aspect, an accessory for use with oscillating power tools includes an attachment portion with a rear end configured to be coupled to the oscillating power tool and a working portion coupled to the attachment portion and extending along an axis. The working portion includes a body bounded at least partially by a front cutting edge with a plurality of teeth opposite the rear end, a first lateral non-cutting edge extending from a first end of the front cutting edge toward the rear end, and a second lateral non-cutting edge opposite the first lateral non-cutting edge and extending from a second end of the front cutting edge toward the rear end. The front cutting edge is arranged asymmetrically relative to the axis with a leading tooth disposed on one side of the axis at a first distance from the rear end of the working portion and a trailing tooth disposed on an opposite side of the axis at a second distance from the rear end of the working portion that is less than the first distance.

Implementations of this aspect may include one or more of the following features. The first distance may be greater than or equal to a distance from all other teeth to the rear end. The second distance may be less than or equal to a distance from all other teeth to the rear end. The leading tooth and the trailing tooth may be at opposite ends of the cutting edge. The teeth may be arranged in a convex arc-shaped pattern along a curve. The curve may have a radius that is centered at a center point on one side of the axis. The center point may be disposed axially rearward of on the attachment portion about which the accessory oscillates during use. The plurality of teeth may be arranged along a straight line at an acute angle relative to the axis.

In another aspect, an accessory for use with oscillating power tools includes an attachment portion with a rear end configured to be coupled to the oscillating power tool and a working portion coupled to the attachment portion and extending along an axis. The working portion includes a body bounded at least partially by a front cutting edge with a plurality of teeth opposite the rear end, a first lateral non-cutting edge extending from a first end of the front cutting edge toward the rear end, and a second lateral non-cutting edge opposite the first lateral non-cutting edge and extending from a second end of the front cutting edge toward the rear end. The plurality of teeth includes a first subset of teeth extending from the first lateral edge toward the axis, a second subset of teeth extending from the second lateral edge toward the axis, and a third subset of teeth disposed between the first subset of teeth and the second subset of teeth and intersecting the axis. The first and second subsets of teeth have the same size, shape, configuration, and spacing, while the third subset of teeth has a different size, shape, configuration, and/or spacing than the first and second subset of teeth.

Implementations of this aspect may include one or more of the following features. The first and second subsets of teeth may be triangular with a coarse tooth pitch and the third subset of teeth may be triangular with a fine tooth pitch. The transition between the subsets may be gradual or sudden.

In another aspect, an accessory for use with oscillating power tools includes an attachment portion with a rear end configured to be coupled to the oscillating power tool and a working portion coupled to the attachment portion and extending along an axis. The working portion includes a body bounded at least partially by a front cutting edge with a plurality of teeth opposite the rear end, a first lateral non-cutting edge extending from a first end of the front cutting edge toward the rear end, and a second lateral non-cutting edge opposite the first lateral non-cutting edge and extending from a second end of the front cutting edge toward the rear end. The plurality of teeth alternate between a first tooth and a second tooth that are different from each other.

Implementations of this aspect may include one or more of the following features. The first tooth may be a triangular tooth having a first rake face at a larger first rake angle facing toward the first lateral edge and a second rake face at a smaller second rake angle facing toward the second lateral edge. The second tooth may be a triangular tooth having a third rake face at a larger third rake angle facing toward the second lateral edge and a fourth rake face at a smaller fourth rake angle facing toward the second lateral edge. The first and second teeth may be mirror images of each other. The first and third rake angles may be the same and the second and fourth rake angles may be the same. The first and second teeth may be separated by alternating first and second gullets. Each first gullet may be disposed between first and third rake faces and have a larger first width and a larger first included angle. Each second gullet may be disposed between second and fourth rake faces and have a smaller first width and a smaller first included angle. The teeth may alternate in pitch and spacing. The first tooth may be a symmetrical triangular tooth having a first rake face and a second rake face each at a first rake angle relative to the axis. The second tooth may be a symmetrical triangular tooth having a third rake face and a fourth rake face each at a second rake angle relative to the axis that is different (e.g., larger) than the first rake angle. The first and second teeth may be separated by alternating first and second gullets that are mirror images of one another and that each have the same included angle and each having the same width. The teeth may alternate in rake angle and size, while being spaced at a constant spacing or pitch.

In another aspect, an accessory for use with oscillating power tools includes an attachment portion with a rear end configured to be coupled to the oscillating power tool and a working portion coupled to the attachment portion and extending along an axis. The working portion includes a body bounded at least partially by a front cutting edge with a plurality of teeth opposite the rear end, a first lateral non-cutting edge extending from a first end of the front cutting edge toward the rear end, and a second lateral non-cutting edge opposite the first lateral non-cutting edge and extending from a second end of the front cutting edge toward the rear end. The front cutting edge includes one or more center teeth each having a symmetrical shape, a first group of asymmetric teeth arranged between the first lateral edge and the one or more center teeth and a second group of asymmetric teeth arranged between the second lateral edge and the at least one center teeth.

Implementations of this aspect may include one or more of the following features. The one or more center teeth may include one or more symmetrical triangular teeth. The first group of teeth and the second group of teeth may be mirror images of one another. Each tooth in the first and second group may have a rake face that is generally parallel to the axis and a relief face 638 at an acute relief angle to a line parallel to the cutting edge. Between each of the teeth in the first and second groups may be a generally U-shaped gullet having a height. The tips of adjacent teeth in the first and second groups may be spaced apart by a pitch distance. The rake faces of the teeth on the first and second groups may face outwardly toward the lateral edges or may face inwardly toward the axis.

In another aspect, an accessory for use with oscillating power tools includes an attachment portion with a rear end configured to be coupled to the oscillating power tool, and a working portion coupled to the attachment portion and extending along an tool axis. The working portion includes a body bounded at least partially by a front cutting edge opposite the rear end, a first lateral edge extending from the front cutting edge toward the rear end, and a second lateral edge opposite the first lateral edge and extending from the front cutting edge toward the rear end. The front cutting edge is arranged asymmetrically relative to the tool axis with a leading tooth disposed at one end of the cutting edge at a first distance from the rear end, a trailing tooth disposed on an opposite end of the cutting edge at a second distance from the rear end that is less than the first distance, and a plurality of intermediate teeth disposed between leading tooth and the trailing tooth and each being disposed less than or equal to the first distance from the rear end of the working portion and greater than or equal to the second distance from the rear end of the working portion, cutting edge slanted at an acute angle to a line that is perpendicular to the tool axis.

Implementations of this aspect may include one or more of the following features. The first distance may be greater than or equal to a distance from all other teeth to the rear end. The second distance may be less than or equal to a distance from all other teeth to the rear end. The cutting edge may include a plurality of teeth arranged in a convex arc shape along a curve. The curve may have a radius that is centered at a center point on one side of the tool axis. The center point may be disposed axially rearward of the attachment portion. A tangent line to the cutting edge at each tooth may be disposed at an acute angle to the line that is perpendicular to the blade axis X. The acute angle may progressively increase from the leading tooth to the trailing tooth. The acute angle of the tangent line at each tooth may be between 0° and 15°. An average of the acute angles may be between 3° and 10°. The acute angle of the tangent line to a center tooth on the cutting edge at the tool axis may be at between 3° and 10°.

The cutting edge may include a plurality of teeth arranged along a straight line arranged at the acute angle relative to the line perpendicular to the tool axis. The acute angle may be between 3° and 10°. The cutting edge may be formed as a cutting edge portion composed of a harder material than the body. The cutting edge portion may be coupled to a front end of the body by welding, brazing, or adhesive. The body may be composed of a first metal and the front cutting edge portion is composed of high speed steel, M42 steel, Matrix 2 steel, or a carbide material. The cutting edge may include a plurality of teeth that alternate between a first tooth and a second tooth that are different from each other. Each first tooth is a triangular tooth may have a first rake face at a first rake angle facing toward the first lateral edge and a second rake face facing toward the second lateral edge at a second rake angle that is smaller than the first rake angle, and each second tooth may have a third rake face facing toward the second lateral edge at a third rake angle that is equal to the first rake angle and a fourth rake face facing toward the first lateral edge at a fourth rake angle that is equal to the second rake angle. The cutting edge may include one or more central teeth each having a symmetrical shape, a first group of asymmetric teeth arranged between the first lateral edge and the one or more central teeth and a second group of asymmetric teeth arranged between the second lateral edge and the at least one central teeth. The one or more central teeth may include one or more symmetrical triangular teeth, the first group of teeth each having a rake face that is parallel to the tool axis and a relief face at an acute relief angle to the tool axis, and the second group of teeth each having a rake face that is parallel to the tool axis and a relief face at an acute relief angle to the tool axis.

Advantages may include one or more of the following. The oscillating accessories may have improved durability, life, and/or cutting speed, including when cutting wood embedded with one or more nails or other metal pieces. These and other advantages and features will be apparent from this application.

DETAILED DESCRIPTION

Figure 1A:
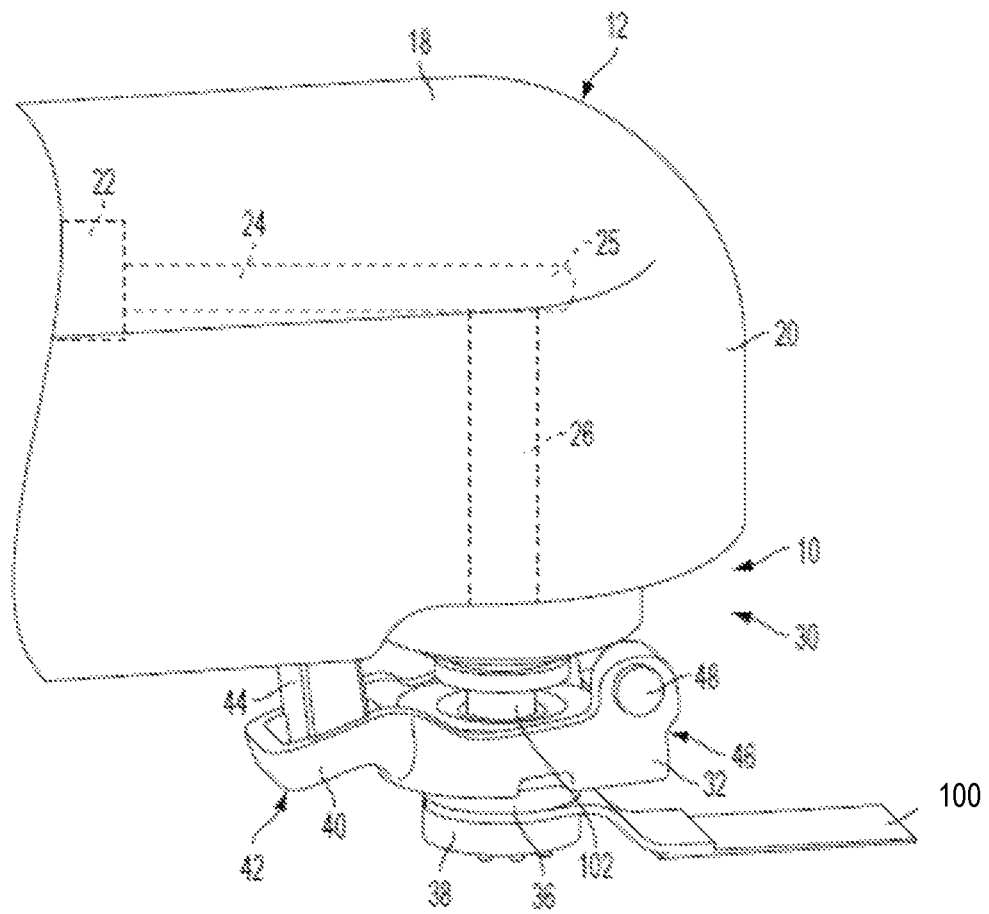
FIG. 1A is a perspective view an oscillating power tool having an implementation of an accessory attachment mechanism.
Figure 1B:
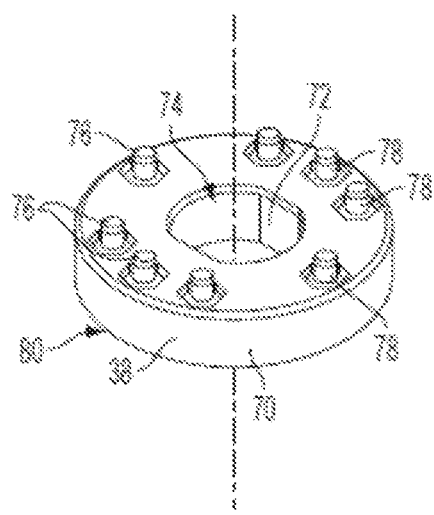
FIG. 1B a perspective view of a clamping plate of the attachment mechanism of FIG. 1A.

Referring to FIGS. 1A and 1B, in an implementation, an oscillating power tool 12 usable with the accessories described in this application is similar to oscillating power tools sold under the brand names DEWALT® and Porter-Cable® and is described further in U.S. Pat. No. 8,925,931, which is hereby incorporated by reference. The power tool 12 includes a tool body 18 including a housing 20 that contains a motor 22 to drive an output member 24. An output spindle 26 is coupled to the motor 22 via a transmission 25 that converts rotary motion of the motor 22 to oscillating motion of the spindle 26. The output of the spindle 26 is coupled to an accessory attachment mechanism 10 via an output shaft 102. The accessory attachment mechanism 10 is configured to receive an accessory 100 (such as a saw blade, rasp, abrasive, etc.) and does not require the use of a separate tool to couple the accessory to the oscillating power tool (also known as a "tool-free" attachment mechanism). An exemplary tool-free attachment mechanism 10 includes a clamp assembly 30 having a first clamp member 36 fixedly coupled to the output spindle, a second clamp member 38 facing the first clamp member 36, and a lever 32 coupled to the second clamp member 38. The lever 32 includes a lever arm 40 with a user engagement portion 42 and a block 44. The lever 32 further includes a pivot portion 46 having a pivot axle 48. The second clamp member 38 includes a second clamp body 70 generally in the form of a ring having a central opening 72. The second clamp body 70 has a second clamping surface 74 having a plurality of mounting features 76 formed thereon. In the example shown, the plurality of mounting features 76 are in the form of male projections 78. In the particular example shown, the eight male projections 78 each have a circular cross section and a tapered shape or form. In another related implementation, the male projections may have an oblong, oval, or rectangular cross-section and may also be tapered. In other implementations, the accessory 100 may be configured for use with or adapted for use with other oscillating power tools and accessory mounting mechanisms for oscillating power tools, such as those disclosed in U.S. patent application Ser. Nos. 16/511,043; 15/893,610; 15/253,559; 15/065,024; 14/909,233; 14/909,247; and Ser. No. 12/798,997; and U.S. Pat. Nos. 10,350,721; 10,137,592; 10,040,215; 9,670,998; 9,272,435; 9,346,183; 8,585,469; 8,182,316, each of which is incorporated by reference. Several implementations of accessories that can be coupled to the accessory attachment mechanism 10 are described below.

Figure 2A:
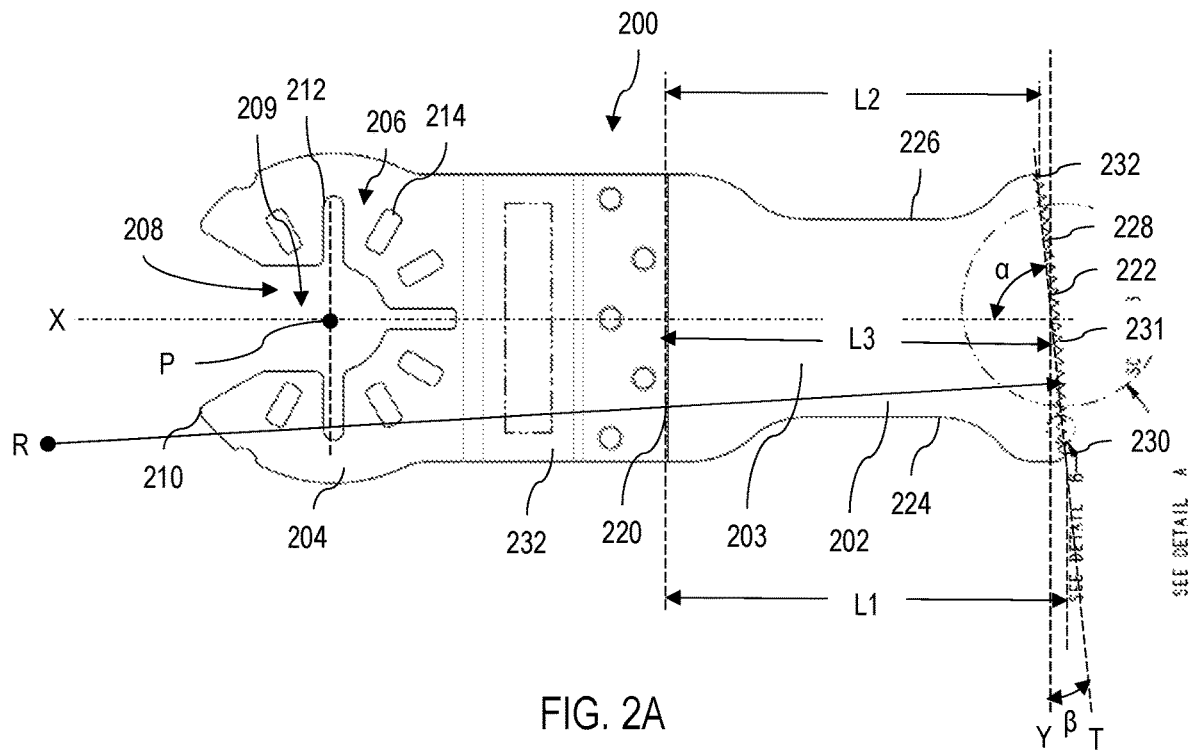
FIG. 2A is a top view of an implementation of an accessory for use with an oscillating power tool.
Figure 2B:
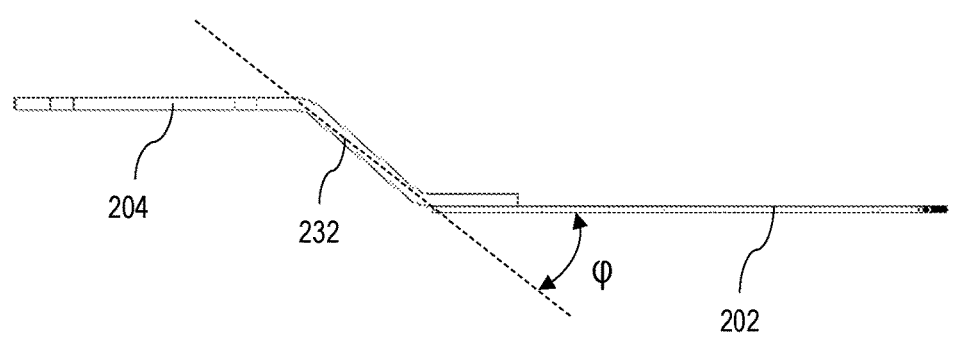
FIG. 2B is a side view of the accessory of FIG. 2A.
Figure 2C:
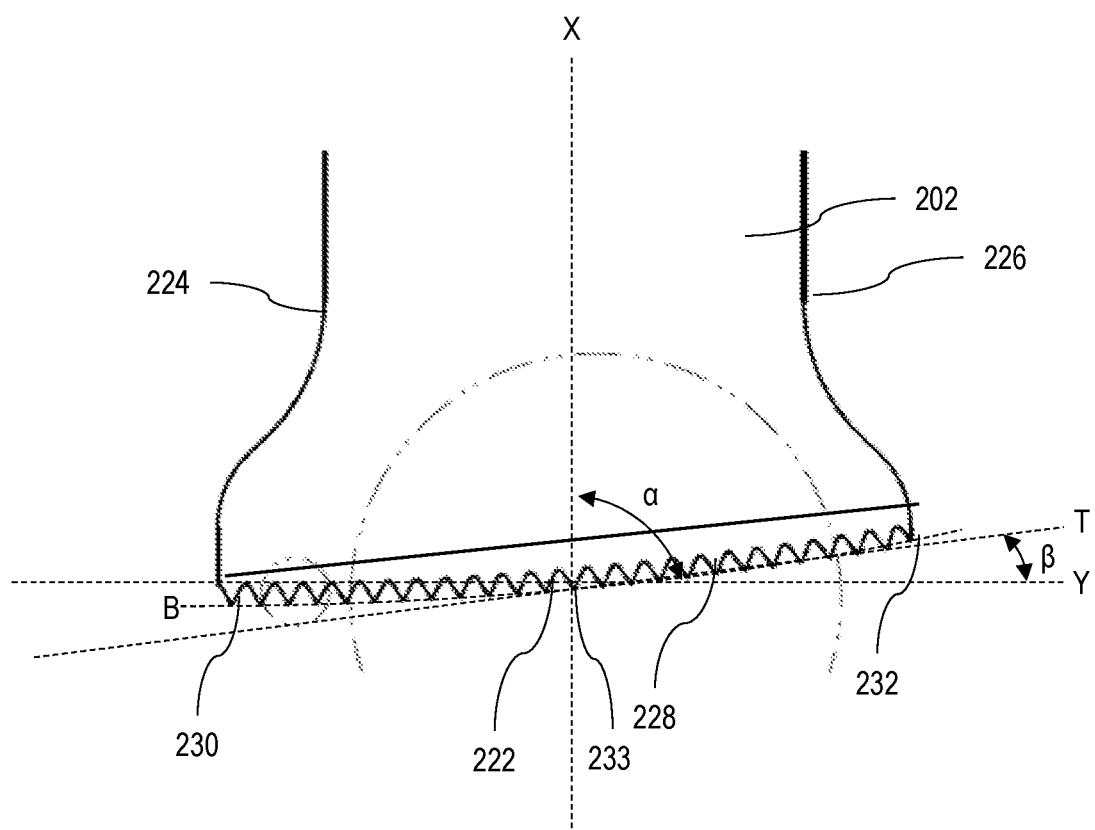
FIG. 2C is a close-up view of the cutting edge of the accessory of FIG. 2A.

Referring to FIGS. 2A-2C, an implementation of an oscillating accessory 200 includes a working portion 202 with a front end 203 and an attachment portion 204 with a rear end 210. In one implementation, the attachment portion 204 includes a plurality of recesses or openings 206 configured to couple the accessory 200 to an attachment mechanism of an oscillating power tool, such as the attachment mechanism 10 of the oscillating power tool 12 described above or the other attachment mechanisms for oscillating power tools incorporated by reference and listed above. The openings 206 may include a generally U-shaped opening 208 extending from a rear end 210 of the accessory 200 and terminating in a central portion 209 centered at a center point about which the accessory 200 oscillates when coupled to the power tool 10. A first set of three radial arm openings 212 are in communication with and extend radially outward from the central portion 208 at approximately 90°, approximately 180°, and approximately 270°, respectively, relative to the U-shaped opening 208. A second set of six radial openings 214 are spaced radially outward from and not in communication with the central portion 209, and are positioned at approximately 60°, approximately 120°, approximately 150°, approximately 210°, approximately 240°, and approximately 300° relative to the U-shaped opening 108. This configuration enable the attachment portion to be coupled to a wide variety of brands of power tools. In other implementations, the attachment portion may have a configuration similar to those shown, e.g., in U.S. Pat. Nos. 10,245,716 and 10,265,778, which are incorporated by reference. In certain implementations, the attachment portion may be universal or nearly universal and/or may be coupleable to two or more the oscillating power tools described and incorporated by reference above.

The working portion 202 is coupled to the attachment portion 204 and extends generally along a longitudinal axis X. The working portion 202 has a body portion 203 bounded at least partially by a front cutting edge portion 222 with a plurality of teeth 228 opposite the rear end 210, a first lateral non-cutting edge 224 extending from a first end of the front cutting edge 222 toward the rear end 210, and a second lateral non-cutting edge 226 opposite the first lateral non-cutting edge 224 and extending from a second end of the front cutting edge 222 toward the rear end 210. As illustrated, the body portion 203 has a generally hourglass shape. In other implementations, the body 203 may have other shapes or configurations such as rectangular, trapezoidal, sector shaped, semi-circular shaped, wedge shaped, etc.

As illustrated in FIG. 2A, the front cutting edge portion 222 and its teeth 228 may be formed directly in the body 203. As illustrated in FIG. 2C, in another implementation, the front cutting edge portion 222 and its teeth 228 may be formed as a separate front cutting edge portion that is coupled to a front end of the body, e.g., by welding, brazing, adhesive, or other attachment mechanisms. Such a front cutting portion may be composed of a different material than the body 203. For example, the body 203 may be composed of a first metal (e.g., low carbon steel and/or tool steel) and the front cutting edge portion 222 may be composed of a second, harder metal (e.g., a high speed steel, such as M42 steel or Matrix 2 steel, for a bi-metal accessory) or a hard metal compound (e.g., a carbide material for a carbide tooth accessory).

In an embodiment, the working portion 202 may have a rear end portion 220 that is connected to the attachment portion 204 by an intermediate portion 232. In the implementation illustrated in FIG. 2B, the working portion 202 and the attachment portion 204 may substantially lie (or may have portions that substantially lie) in parallel planes that are offset from one another by a height H (e.g., approximately 0.3 inches to approximately 0.6 inches). The intermediate portion 232 may be disposed at a right angle or an acute angle φ (e.g., approximately 15° to approximately 89°) to the attachment portion. This offset may make it easier for the blade 200 to be plunged deeper into a workpiece without interference from the clamp assembly 10 on the oscillating power tool 12. In other implementations, the working portion 202 and the attachment portion 204 may be substantially co-planar (or have portions that are substantially co-planar) or may substantially lie (or have portions that substantially lie) in planes that are at an angle to one another. It will be understood to one of ordinary skill in the art that the working portion 202 and the attachment portion 204 may not be planar but instead may have portions that substantially lie in or along a plane or may be curved.

The teeth 228 on the front cutting edge 222 are asymmetrically arranged relative to the blade axis X. The cutting edge 222 is generally slanted at an acute angle α relative to the blade axis X. The cutting edge 222 includes a leading tooth 230 on one end of the cutting edge 222 located on one side of the axis X (e.g., at an intersection between the front cutting edge 222 and the first lateral edge 224) and a trailing tooth on an opposite end of the front cutting edge 222 located on an opposite side of the axis X (e.g., at an intersection between the front cutting edge 222 and the second lateral edge 226). The leading tooth 230 is disposed a first distance L1 from the rear end 210 of the accessory and the trailing tooth 232 is disposed a second distance L2 from the rear end 210 of the accessory that is less than the first distance. The first distance L1 may be greater than or equal to a distance from all other teeth 228 to the rear end 210 of the accessory and the second distance L2 may be less than or equal to a distance from all other teeth 228 to the rear end 210 of the accessory. The intermediate teeth 231 between the leading tooth 230 and the trailing tooth 232 each are disposed an intermediate distance L3 from the rear end 210 of the accessory that is less than or equal to the first distance L1 and greater than or equal to the second distance L2. The intermediate distances L3 of the intermediate teeth 231 from the rear end 210 of the accessory may progressively decrease from the leading tooth 230 to the trailing tooth 232.

In the embodiment illustrated in FIGS. 2A-2C, the cutting edge 222 has a convex arc-shape pattern along a curve B that connects the tips of the teeth 228. The curve B has a radius R that is centered at a center point C on one side of the axis X so that the front cutting edge 222 is asymmetrically arranged relative to the blade axis X. The center point C also may be disposed axially rearward of a center point P of the U-shaped opening 208 about which the accessory 200 oscillates when coupled to the tool 10. Along the curved cutting edge 222 from the leading tooth 230 to the trailing tooth 232, tangent lines T1, T2, T3, etc. to the curve B at points P1, P2, P3, etc. are disposed at an acute angles β1, β2, β3, etc. to a line Y that is perpendicular to the blade axis X, with the tangent angles β1, β2, β3, etc. progressively increasing from the leading tooth 230 to the trailing tooth 232 (e.g., from approximately 0° at the leading tooth 230 to approximately 15° at the trailing tooth 232, with an average tangent angle $β_{Cg}$ of approximately 3° to 10° (e.g., approximately 5°). In some embodiments the angle β2 of one of the tangent lines T2 to the line Y at a center tooth 233 is approximately 3° to 10° (e.g., approximately 5°)). In this way the line or curve B that connects the tips of the teeth 228 is slanted most or all of its entirety at an acute angle relative to the blade axis X.

The leading tooth 230 and the trailing tooth 232 may be at opposite ends of the cutting edge 222 or one or both may be disposed at intermediate locations along the cutting edge 222. In the illustrated implementation, the teeth 228 each have the same size, form, shape, and spacing from adjacent teeth. In the illustrated implementation, each tooth 228 has a symmetrical triangular shape with rake faces joined at a cutting edge. In other implementations, the teeth 228 may have different and/or variable sizes, forms, shapes, and spacing.

Figures 2D, 2E, 2F:
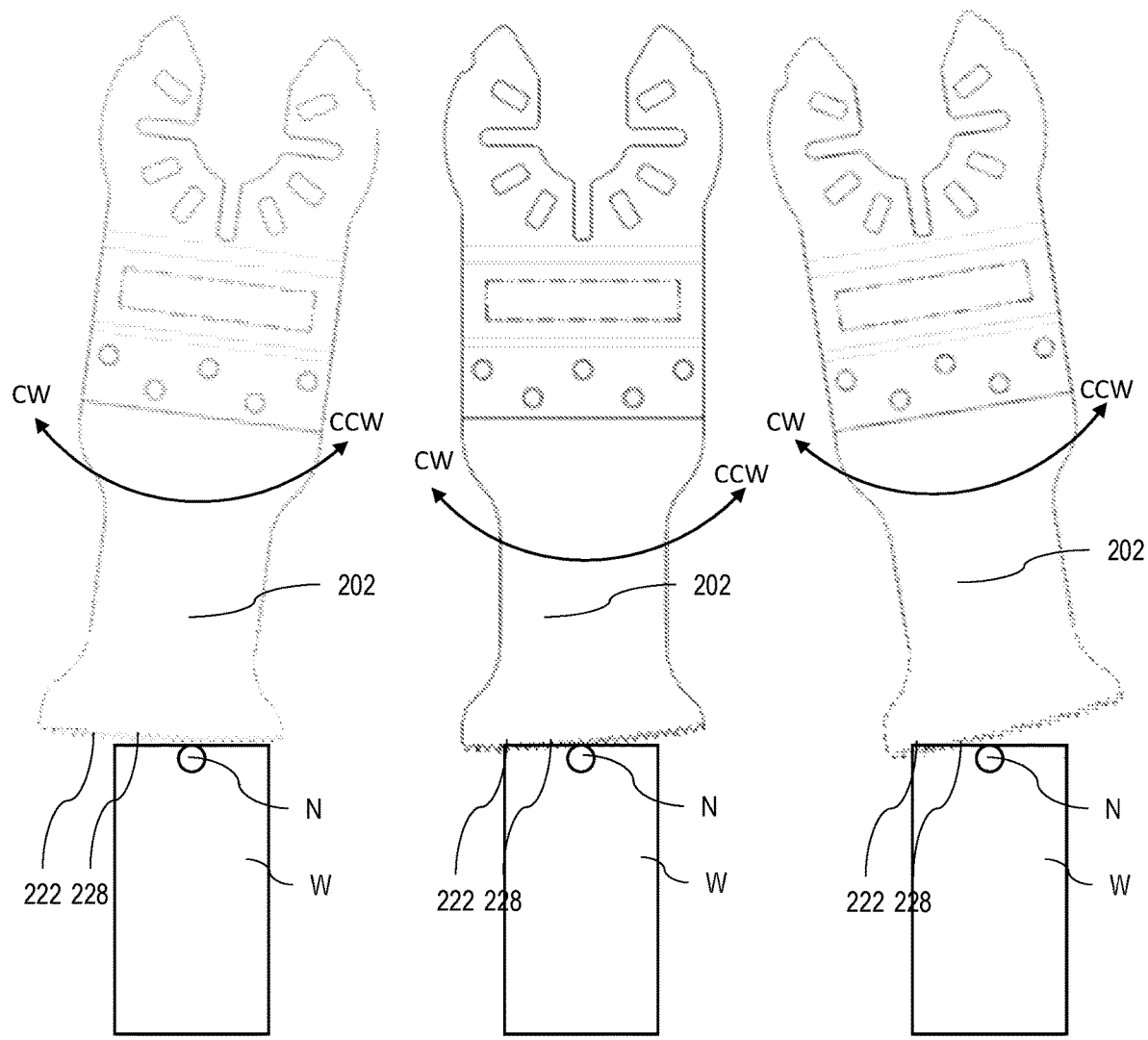
FIGS. 2D, 2E, and 2F are schematic views of the accessory of FIG. 2A during operation.

As shown in FIGS. 2D-2F, in operation, the slanted and curved front cutting edge 222 facilitates cutting wood workpieces W with nails N embedded therein. The slanted and curved front cutting edge 222 allows cutting to only occur when the blade is oscillating in one direction, and then allows the blade to clear any chips or debris when cutting in the opposite direction. As the blade oscillates in the counterclockwise direction CCW (from the position in FIG. 2D to the position in FIG. 2E to the position in FIG. 2F), the teeth 228 on the cutting edge 222 dig into the workpiece to make a cut in the workpiece W and to cut through the nail N. As the blade oscillates in the opposite clockwise direction CW (from the position in FIG. 2F to the position in FIG. 2E to the position in FIG. 2D), the teeth 228 on the cutting edge 222 are generally disengaged from the cut made in the workpiece, the cutting edge facilitates clearance of chips and debris from the cut. This helps dissipate heat and prolong blade, tooth, and cutting edge life.

Figure 3A:
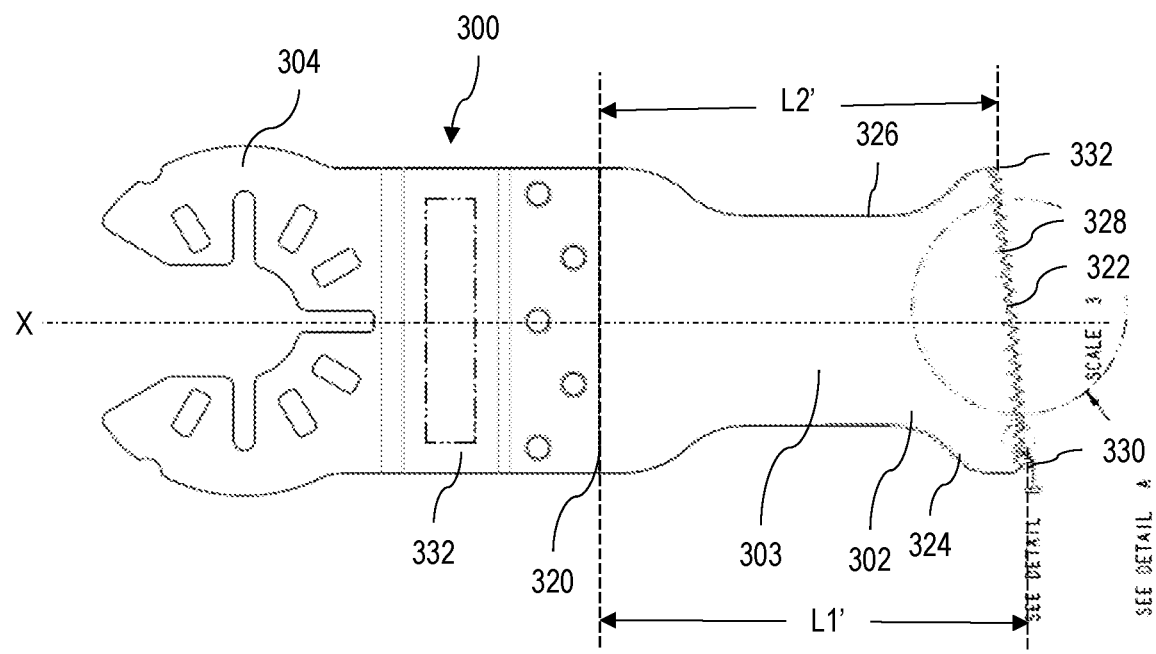
FIG. 3A is a top view of another implementation of an accessory for use with an oscillating power tool.
Figure 3B:
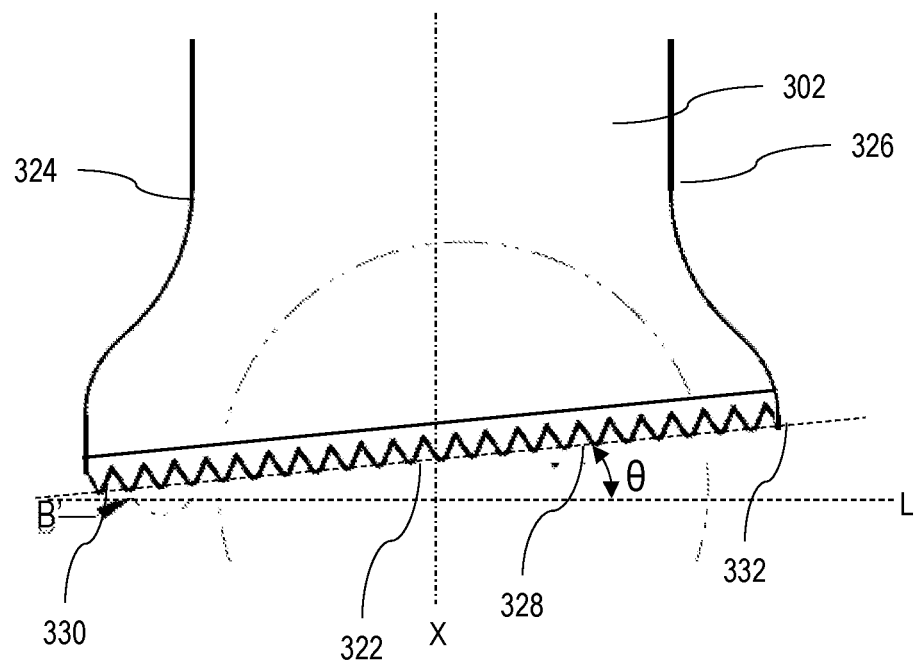
FIG. 3B is a close-up view of the cutting edge of the accessory of FIG. 3A.

Referring to FIGS. 3A-3B, in another implementation, an oscillating accessory 300 has a working portion 302, an attachment portion 304 with a rear end 310, and an intermediate portion 332 that are the same as the working portion 202, attachment portion 204, and intermediate portion 232 of the accessory 200, except for the following differences. The working portion 302 has a slanted front cutting edge portion 322 with a plurality of teeth 328 that are arranged along a straight line B' that is slanted at an acute angle θ (e.g., approximately 3° to approximately 10°, such as approximately 5°) relative to a line L that is perpendicular to the axis X so that the front cutting edge 322 is asymmetrically arranged relative to the axis X. The cutting edge portion 322 includes a leading tooth 330 on one side of the axis X (e.g., at an intersection between the front cutting edge 322 and the first lateral edge 324) and a trailing tooth 332 on an opposite side of the axis X (e.g., at an intersection between the front cutting edge 322 and the second lateral edge 324). The leading tooth 330 is disposed a first distance L1' from the rear end 310 of the accessory and the trailing tooth 332 is disposed a second distance L2' from the rear end 310 of the accessory that is less than the first distance. The first distance L1' may be greater than or equal to a distance from all other teeth 328 to the rear end 310 of the accessory and the second distance L2' may be less than or equal to a distance from all other teeth 328 to the rear end 310 of the accessory.

As illustrated in FIG. 3A, the front cutting edge portion 322 and its teeth 328 may be formed directly in the body 303. As illustrated in FIG. 3B, in another implementation, the front cutting edge portion 322 and its teeth 328 may be formed as a separate front cutting edge portion that is coupled to a front end of the body, e.g., by welding, brazing, adhesive, or other attachment mechanisms. Such a front cutting portion may be composed of a different material than the body 303. For example, the body 303 may be composed of a first metal (e.g., low carbon steel and/or tool steel) and the front cutting edge portion 322 may be composed of a second, harder metal (e.g., a high speed steel, such as M42 steel or Matrix 2 steel, for a bi-metal accessory) or a hard metal compound (e.g., a carbide material for a carbide tooth accessory).

The leading tooth 330 and the trailing tooth 332 may be at opposite ends of the cutting edge 322 or one or both may be disposed at intermediate locations along the cutting edge 322. In the illustrated implementation, the teeth 328 each have the same size, form, shape, and spacing from adjacent teeth. In the illustrated implementation, each tooth 328 has a symmetrical triangular shape with rake faces joined at a cutting edge. In other implementations, the teeth 328 may have different and/or variable sizes, forms, shapes, and spacing.

Figures 3C, 3D, 3E:
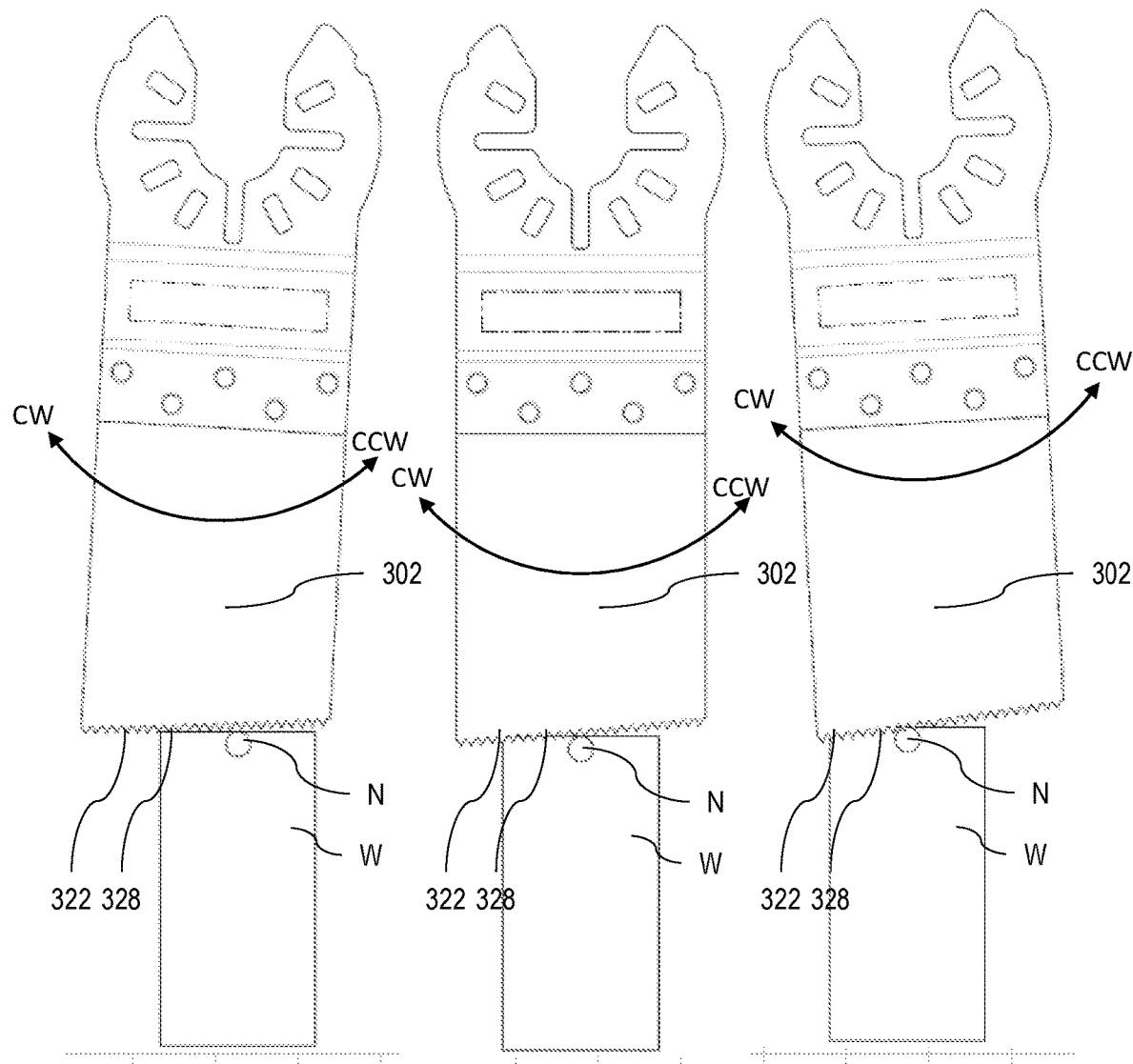
FIGS. 3C, 3D, and 3E are schematic views of the accessory of FIG. 3A during operation.

As shown in FIGS. 3C-3E, in operation, the slanted front cutting edge 322 facilitates cutting wood workpieces W with nails N embedded therein. The slanted front cutting edge 322 allows cutting to only occur when the blade is oscillating in one direction, and then allows the blade to clear any chips or debris when cutting in the opposite direction. As the blade oscillates in the counter-clockwise direction CCW (from the position in FIG. 3C to the position in FIG. 3D to the position in FIG. 3E), the teeth on the cutting edge dig into the workpiece to make a cut in the workpiece W and to cut through the nail N. As the blade oscillates in the opposite clockwise direction CW (from the position in FIG. 3E to the position in FIG. 3D to the position in FIG. 3C), the teeth on the cutting edge are generally disengaged from the cut made in the workpiece, the cutting edge facilitates clearance of chips and debris from the cut. This helps dissipate heat and prolong blade, tooth, and cutting edge life.

Oscillating saw blades having an asymmetric slanted cutting edge similar to the ones disclosed in FIGS. 2A-2F and 3A-3E have dramatically increased blade life than saw blades without such a cutting edge. For example, in an experiment, samples of an experimental oscillating cutting blade having a straight asymmetric slanted cutting edge at approximately 5°, a 0.023 inch blade thickness and teeth made of M42 steel were life tested cutting 1" wide and 3" tall nail embedded pine. They were compared to an existing blade having the same thickness and tooth material but a straight cutting edge (perpendicular to the blade axis). As shown in the below Table 1, the blade with the slanted cutting edge had an average life of 10.0 cuts until failure, while the blade having symmetric straight cutting edge (perpendicular to the blade axis) had an average life of 2.2 cuts until failure. This represents an approximately five-fold increase in blade life, which was far greater than expected.

TABLE 1

Life cutting 1" wide × 3" tall nail embedded pine

| Sample | 50° Slanted Cutting Edge 0.023" Blade Thickness M42 Steel Tooth Material | Straight Cutting Edge 0.023" Blade Thickness M42 Steel Tooth Material |
|---|---|---|
| 1 | 9 | 1 |
| 2 | 7 | 1 |
| 3 | 14 | 5 |
| 4 | 10 | 3 |
| 5 | 8 | 1 |
| 6 | 12 | 2 |
| Avg: | 10.0 | 2.2 |

In another sample experiment, three designs of oscillating cutting blades in accordance with the embodiment of FIGS. 3A-3E were life tested cutting 1" wide and 3" tall nail embedded pine. As shown in the below Table 2, the three designs had each had an asymmetric slanted cutting edge at approximately 5°. Design 1 had a blade thickness of 0.023" and teeth made of M42 steel. Design 2 had a blade thickness of 0.031" and teeth made of Matrix 2 steel. Design 3 had a blade thickness of 0.027" and teeth made of Matrix 2 steel. These were compared to an existing Bosch OSL114F blade (which is marketed as the leader in blade life in cutting nail embedded wood) having a symmetric curved cutting edge, a blade thickness of 0.023", and teeth made of Matrix 2 high speed steel and a DEWALT DWA4203 blade having a straight cutting edge (perpendicular to the blade axis), a 0.025" blade thickness, and teeth made of M42 steel. As shown in Table 2, the experimental blades with Designs 1, 2, and 3 had an average life of 10.0, 7.6, and 7.8 cuts until failure, as compared to the Bosch blade having a life of 6.7 cuts until failure and the DEWALT blade having a life of 0.8 cuts until failure. This represents a much larger than expected increase in blade life.

TABLE 2

Life cutting 1" wide × 3" tall nail embedded pine

| Sample | Bosch OSL114F Symmetric Curved Cutting Edge; 0.023" thickness; Matrix 2 teeth | DEWALT DWA4203 Straight Cutting Edge; 0.025" thickness; M42 teeth | Design 1 5° Slanted Cutting Edge; 0.023" thickness; M42 steel teeth | Design 2 5° Slanted Cutting Edge; 0.031" thickness; Matrix 2 teeth | Design 3 5° Slanted Cutting Edge; 0.027" thickness; Matrix 2 teeth |
|---|---|---|---|---|---|
| 1 | 8 | 0 | 9 | 7 | 8 |
| 2 | 11 | 1 | 7 | 3 | 10 |
| 3 | 2 | 1 | 14 | 9 | 6 |
| 4 | 2 | 2 | 10 | 10 | 3 |
| 5 | 7 | 0 | 8 | 9 | 7 |
| 6 | 13 | 1 | 12 |  | 13 |
| 7 | 4 |  |  |  |  |
| Avg: | 6.7 | 0.8 | 10.0 | 7.6 | 7.8 |

Even more unexpected, blades of the design of FIGS. 3A-3E have a faster cutting speed than the Bosch OSL114F blade. It is usually expected that the blade cutting speed will vary inversely to life so that as the life increases the cutting speed will decrease. This was especially true in this case because the blade with the slanted cutting edge cuts only when the blade is oscillating in one direction. However, unexpectedly, as shown in Table 3 below, the blade with the asymmetric slanted cutting edge has a faster cutting speed of 7.88 seconds per cut versus the Bosch OSL114 blade, which has a slower cutting speed of 8.40 seconds per cut. This represents an increase in cutting speed, which was contrary to expectations.

TABLE 3

Cut time (seconds) in 1" wide × 3" tall nail embedded pine

| Sample | 5° Slanted Cutting Edge; 0.023" thickness; M42 steel teeth | Bosch OSL114F Symmetric Curved Cutting Edge; 0.023" thickness; Matrix 2 teeth |
|---|---|---|
| 1 | 9.2 | 7.6 |
| 2 | 8.0 | 8.2 |
| 3 | 6.7 | |
| 4 | 8.9 | |
| 5 | 7.6 | 8.9 |
| 6 | 6.9 | 8.9 |
| Avg: | 7.88 | 8.40 |

Figure 4A:
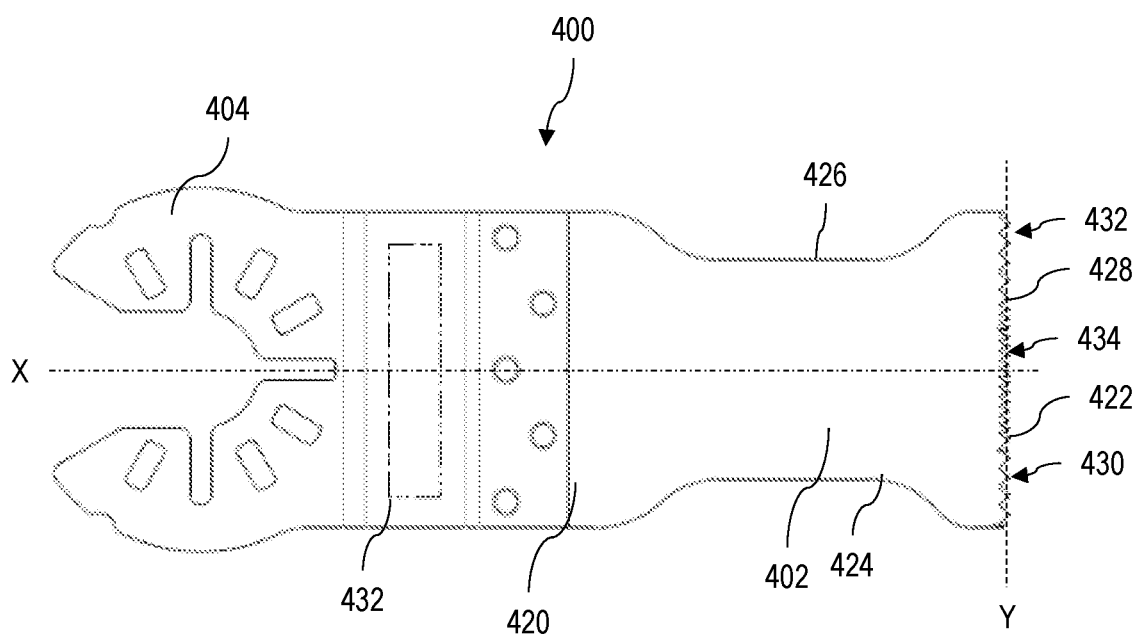
FIG. 4A is a top view of another implementation of an accessory for use with an oscillating power tool.
Figure 4B:
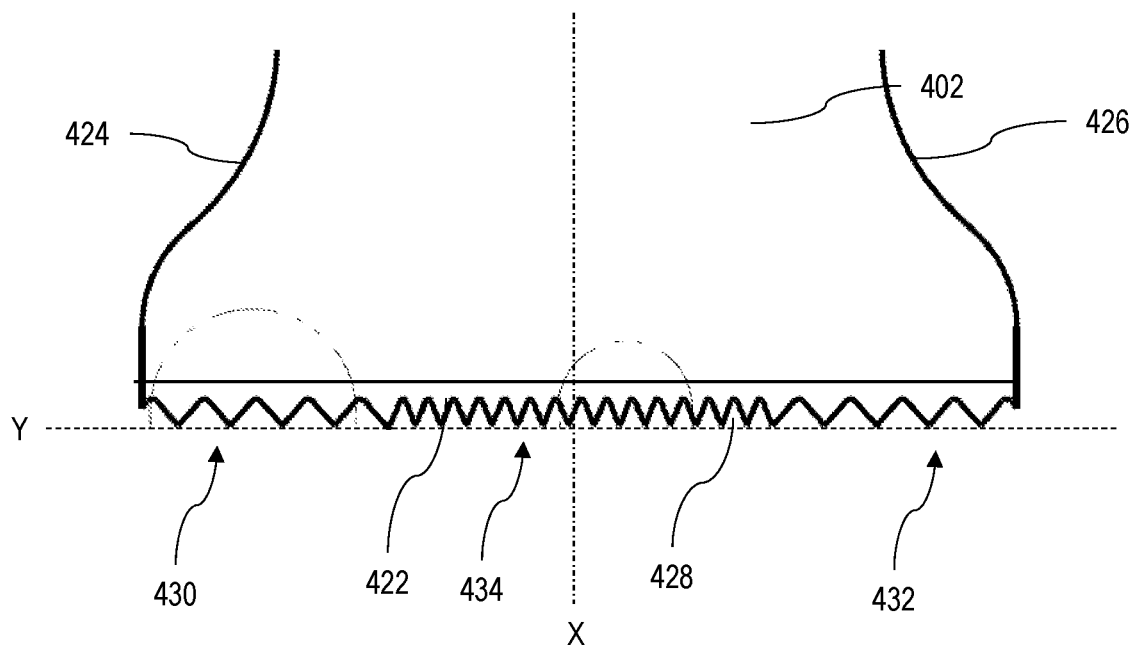
FIG. 4B is a close-up view of the cutting edge of the accessory of FIG. 4A.

Referring also to FIGS. 4A-4B, in another implementation, an oscillating accessory 400 has a working portion 402, an attachment portion 404 with a rear end 410, and an intermediate portion 432 that are the same as the working portion 202, attachment portion 204, and intermediate portion 232 of the accessory 200, except for the following differences. The working portion 402 has a front cutting edge 422 with a plurality of teeth 428 that are arranged along a straight line Y that is generally perpendicular to the axis X. The plurality of teeth includes a first subset of teeth 430 extending from the first lateral edge 424 toward the axis X, a second subset of teeth 432 extending from the second lateral edge 426 toward the axis X, and a third subset of teeth 434 disposed between the first subset of teeth 430 and the second subset of teeth 432 and intersecting the axis X. The first and second subsets of teeth 430, 432 have the same size, shape, configuration, and spacing, while the third subset of teeth 434 has a different size, shape, configuration, and/or spacing than the first and second subset of teeth 430, 432. In the illustrated implementation, the first and second subsets of teeth 430, 432 are triangular with a coarse tooth pitch and the third subset of teeth 434 are triangular with a fine tooth pitch. The transition between the subsets may be gradual or sudden.

As illustrated in FIG. 4A, the front cutting edge portion 422 and its teeth 428 may be formed directly in the body 402. As illustrated in FIG. 4B, in another implementation, the front cutting edge portion 422 and its teeth 428 may be formed as a separate front cutting edge portion that is coupled to a front end of the body 402, e.g., by welding, brazing, adhesive, or other attachment mechanisms. Such a front cutting portion may be composed of a different material than the body 402. For example, the body 402 may be composed of a first metal (e.g., low carbon steel and/or tool steel) and the front cutting edge portion 422 may be composed of a second, harder metal (e.g., a high speed steel, such as M42 steel or Matrix 2 steel, for a bi-metal accessory) or a hard metal compound (e.g., a carbide material for a carbide tooth accessory).

Figure 5A:
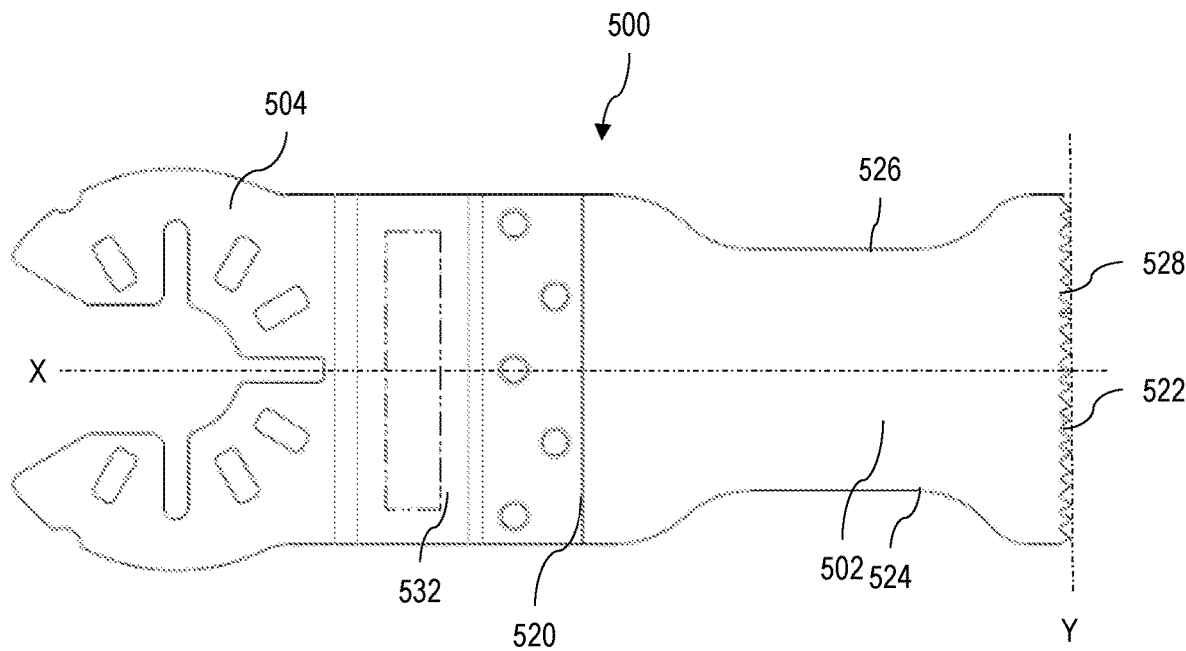
FIG. 5A is a top view of another implementation of an accessory for use with an oscillating power tool.
Figure 5B:
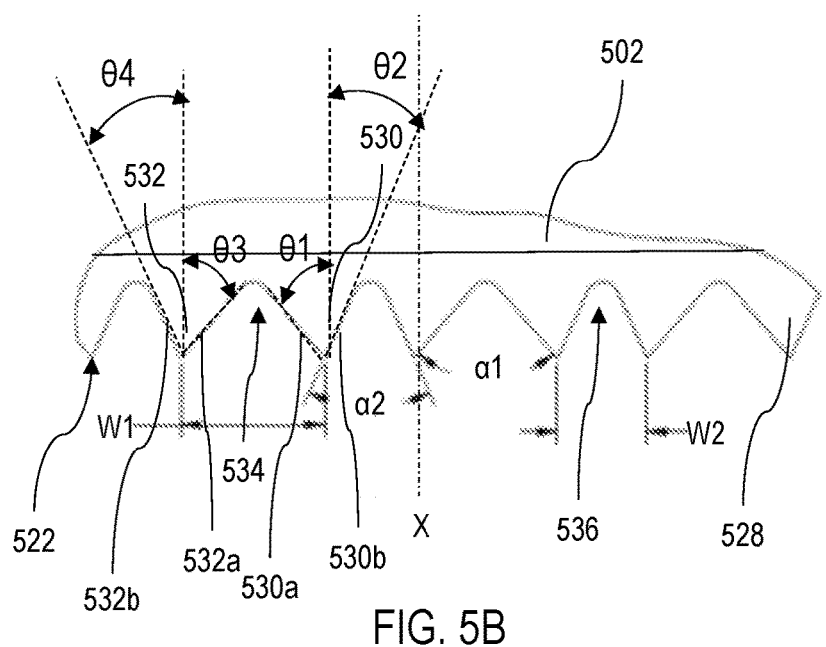
FIG. 5B is a close-up view of the cutting edge of the accessory of FIG. 5A.

Referring also to FIGS. 5A-5B, in another implementation, an oscillating accessory 500 has a working portion 502, an attachment portion 504 with a rear end 510, and an intermediate portion 532 that are the same as the working portion 202, attachment portion 204, and intermediate portion 232 of the accessory 200, except for the following differences. The working portion 502 has a front cutting edge 522 with a plurality of teeth 528 that are arranged along a straight line Y that is generally perpendicular to the axis X. The plurality of teeth 528 alternate between a first tooth 530 and a second tooth 532 that are different from one another. In the illustrated implementation, the first and second teeth 530, 532 are mirror images of each other. The first tooth 530 is a triangular tooth having a first rake face 530a at a larger first rake angle $\theta 1$ facing toward the first lateral edge 524 and a second rake face 530b at a smaller second rake angle $\theta 2$ facing toward the second lateral edge 526. The second tooth 532 is a triangular tooth having a third rake face 532a at a larger third rake angle $\theta 3$ facing toward the second lateral edge 524 and a fourth rake face 532b at a smaller fourth rake angle $\theta 4$ facing toward the second lateral edge 526. In an implementation, the first and third rake angles $\theta 1$, $\theta 3$ are the same and the second and fourth rake angles $\theta 2$, $\theta 4$ are the same. The first and second teeth 530, 532 are separated by alternating first and second gullets 535, 536. Each first gullet 534 is disposed between first and third rake faces 530a, 532a and have a larger first width W1 and a larger first included angle $\alpha 1$. Each second gullet 536 is disposed between second and fourth rake faces 530b, 532b and have a smaller first width W2 and a smaller first included angle $\alpha 2$. Thus, the teeth 528 alternate in pitch and spacing. In other implementations, the teeth 528 could have more than two sizes, shapes, configurations, and/or spacing of teeth, and/or may have alternating groups of teeth having similar sizes, shapes, configurations, and/or spacing within each group.

As illustrated in FIG. 5A, the front cutting edge portion 522 and its teeth 528 may be formed directly in the body 502. As illustrated in FIG. 5B, in another implementation, the front cutting edge portion 522 and its teeth 528 may be formed as a separate front cutting edge portion that is coupled to a front end of the body 502, e.g., by welding, brazing, adhesive, or other attachment mechanisms. Such a front cutting portion may be composed of a different material than the body 502. For example, the body 502 may be composed of a first metal (e.g., low carbon steel and/or tool steel) and the front cutting edge portion 522 may be composed of a second, harder metal (e.g., a high speed steel, such as M42 steel or Matrix 2 steel, for a bi-metal accessory) or a hard metal compound (e.g., a carbide material for a carbide tooth accessory).

Figure 5C:
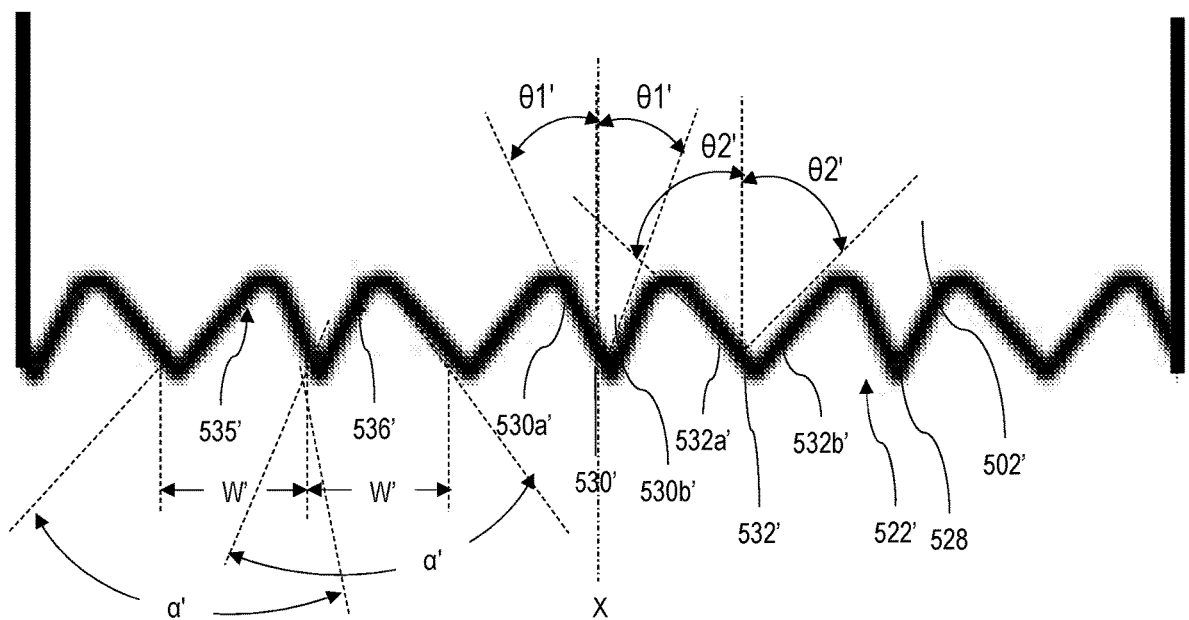
FIG. 5C is a close-up view of a cutting edge of another implementation of an accessory for use with an oscillating power tool

Referring also to FIG. 5C, in another implementation, an oscillating accessory 500' has a working portion 502', an attachment portion 504 with a rear end 510, and an intermediate portion that are the same as the working portion 502, attachment portion 504, and intermediate portion 532 of the accessory 500, except for the following differences. The working portion 502' has a front cutting edge 522' with a plurality of teeth 528' that alternate between a first tooth 530' and a second tooth 532' that are different from one another. The first tooth 530' is a symmetrical triangular tooth having a first rake face 530a' and a second rake face 530b' each at a first rake angle $\theta 1'$ relative to the axis X. The second tooth 532' is a symmetrical triangular tooth having a third rake face 532a' and a fourth rake face 532b' each at a second rake angle $\theta 2'$ relative to the axis X that is different (e.g., larger) than the first rake angle $\theta 1'$. The first and second teeth 530', 532' are separated by alternating first and second gullets 535', 536' that are mirror images of one another and that each have the same included angle $\alpha'$ and each having the same width W'. Thus, the teeth 528' alternate in rake angle and size, while they are spaced at a constant spacing or pitch. In other implementations, the teeth 528' could have more than two sizes, shapes, configurations, and/or spacing of teeth, and/or may have alternating groups of teeth having similar sizes, shapes, configurations, and/or spacing within each group.

Figure 6A:
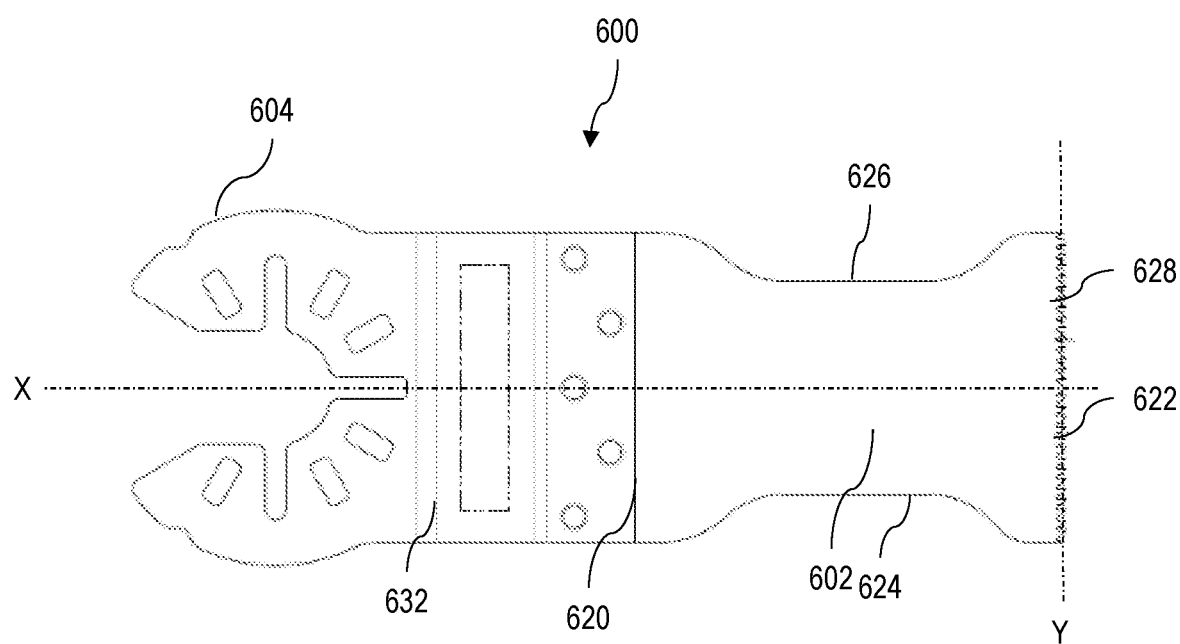
FIG. 6A is a top view of another implementation of an accessory for use with an oscillating power tool.
Figure 6B:
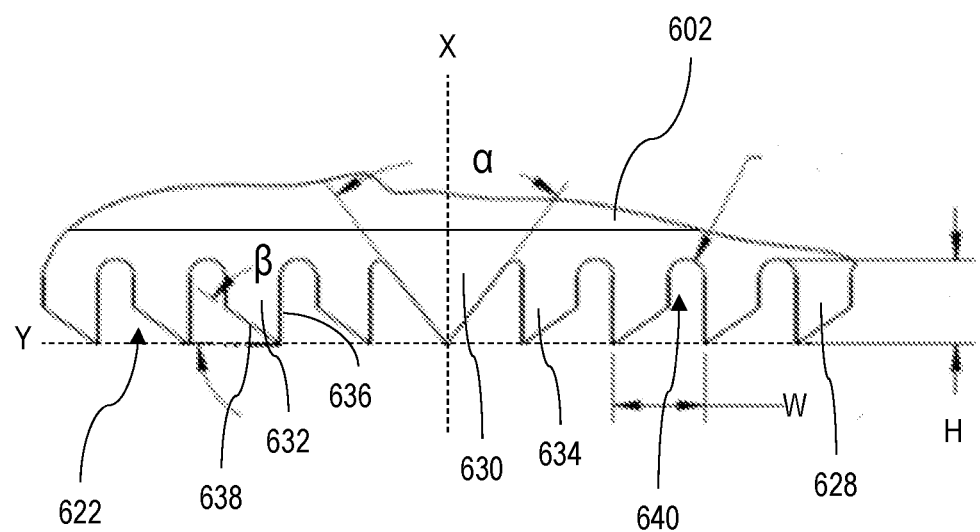
FIG. 6B is a close-up view of the cutting edge of the accessory of FIG. 6A.

Referring also to FIGS. 6A-6B, in another implementation, an oscillating accessory 600 has a working portion 602, an attachment portion 604 with a rear end 610, and an intermediate portion 632 that are the same as the working portion 202, attachment portion 204, and intermediate portion 232 of the accessory 200, except for the following differences. The working portion 602 has a front cutting edge 622 with a plurality of teeth 628 that are arranged along a straight line Y that is generally perpendicular to the axis X. The plurality of teeth 628 include a center tooth 630 having a symmetrical triangular shape aligned along the axis X, a first group of asymmetric teeth 632 arranged between the first lateral edge 624 and the center tooth 630 and a second group of asymmetric teeth 634 arranged between the second lateral edge 626 and the center tooth 630. The first group of teeth 632 and the second group of teeth 634 are mirror images of one another. The center tooth 630 has rake faces 630a, 630b that define an included angle α between them. Each first and second tooth 632, 634 has a rake face 636 that is generally parallel to the axis X and a relief face 638 at a relief angle β to a line parallel to the cutting edge. Between each of the first teeth 632 and each of the second teeth 634 is a generally U-shaped gullet 640 having a height H. The tips of adjacent first and second teeth 632, 634 are spaced apart by a pitch distance P. In other implementations, the center tooth may comprise a plurality of center teeth that have the same sizes, shapes, configurations, and/or spacing, and/or the first teeth and the second teeth may be interspersed with one another.

As illustrated in FIG. 6A, the front cutting edge portion 622 and its teeth 628 may be formed directly in the body 602. As illustrated in FIG. 6B, in another implementation, the front cutting edge portion 622 and its teeth 628 may be formed as a separate front cutting edge portion that is coupled to a front end of the body 602, e.g., by welding, brazing, adhesive, or other attachment mechanisms. Such a front cutting portion may be composed of a different material than the body 602. For example, the body 602 may be composed of a first metal (e.g., low carbon steel and/or tool steel) and the front cutting edge portion 622 may be composed of a second, harder metal (e.g., a high speed steel, such as M42 steel or Matrix 2 steel, for a bi-metal accessory) or a hard metal compound (e.g., a carbide material for a carbide tooth accessory).

Figure 7:
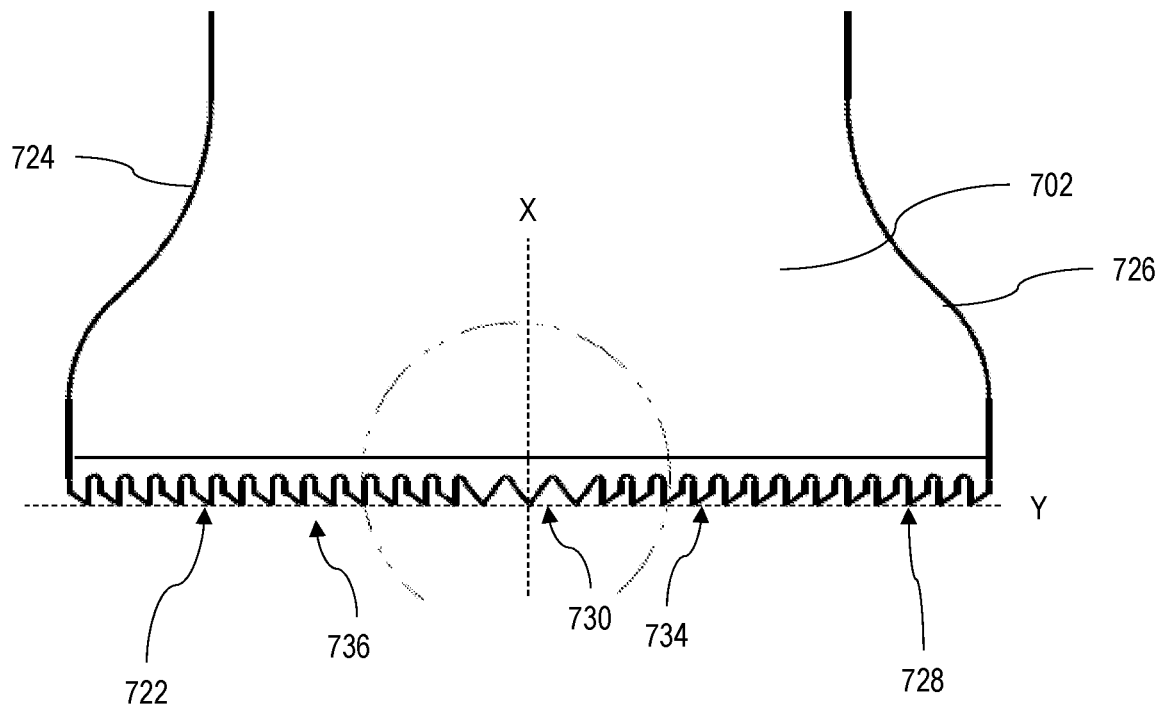
FIG. 7 is a close-up view of a cutting edge of another implementation of an accessory for use with an oscillating power tool.

Referring to FIG. 7, in another implementation, an oscillating accessory 700 has a working portion 702, an attachment portion 704 with a rear end 710, and an intermediate portion that are the same as the working portion 602, attachment portion 604, and intermediate portion 632 of the accessory 600, except for the following differences. The working portion 702 has a front cutting edge 722 with a plurality of teeth 728 arranged along a straight line Y that is generally perpendicular to the axis X. The plurality of teeth 728 differ from the plurality of teeth 628 in that they include a plurality of (e.g., three) center teeth 730 each having a symmetrical triangular shape instead of a single center tooth 630. The center teeth 730 are arranged symmetrically about the axis X. The plurality of teeth 728 also have a first group of asymmetric teeth 732 arranged between the first lateral edge 724 and the center teeth 730 and a second group of asymmetric teeth 734 arranged between the second lateral edge 726 and the center teeth 730. The first and second groups of teeth 732, 734 are substantially the same as the teeth 632, 634 described above.

As shown in FIG. 7, the front cutting edge portion 722 and its teeth 728 may be formed as a separate front cutting edge portion that is coupled to a front end of the body 702, e.g., by welding, brazing, adhesive, or other attachment mechanisms. Such a front cutting portion may be composed of a different material than the body 702. For example, the body 702 may be composed of a first metal (e.g., low carbon steel and/or tool steel) and the front cutting edge portion 722 may be composed of a second, harder metal (e.g., a high speed steel, such as M42 steel or Matrix 2 steel, for a bi-metal accessory) or a hard metal compound (e.g., a carbide material for a carbide tooth accessory). In other embodiments, the front cutting edge portion and its teeth may be formed directly on the body and be composed of the same material as the body.

Figure 8:
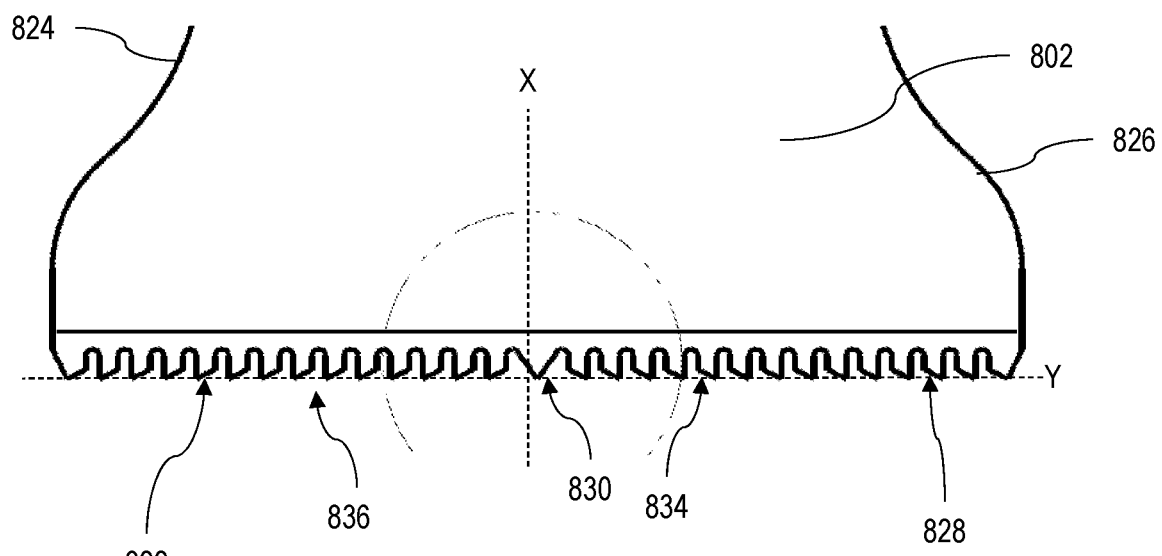
FIG. 8 is a close-up view of a cutting edge of another implementation of an accessory for use with an oscillating power tool.

Referring to FIG. 8, in another implementation, an oscillating accessory 800 has a working portion 802, an attachment portion 804 with a rear end 810, and an intermediate portion that are the same as the working portion 602, attachment portion 604, and intermediate portion 632 of the accessory 600, except for the following differences. The working portion 802 has a front cutting edge 822 with a plurality of teeth 828 arranged along a straight line Y that is generally perpendicular to the axis X. Like the teeth 628, the plurality of teeth 828 include a center tooth teeth 830 having a symmetrical triangular shape centered on the axis X, a first group of asymmetric teeth 832 arranged between the first lateral edge 824 and the center teeth 830, and a second group of asymmetric teeth 834 arranged between the second lateral edge 826 and the center teeth 830. The first and second groups of teeth 832, 834 are substantially the same as the teeth 632, 634 described above except that they mirror images so that the rake faces face outward toward the lateral edges 824, 826 instead of inward to the axis X like the teeth 632, 634.

As shown in FIG. 8, the front cutting edge portion 822 and its teeth 828 may be formed as a separate front cutting edge portion that is coupled to a front end of the body 802, e.g., by welding, brazing, adhesive, or other attachment mechanisms. Such a front cutting portion may be composed of a different material than the body 802. For example, the body 802 may be composed of a first metal (e.g., low carbon steel and/or tool steel) and the front cutting edge portion 822 may be composed of a second, harder metal (e.g., a high speed steel, such as M42 steel or Matrix 2 steel, for a bi-metal accessory) or a hard metal compound (e.g., a carbide material for a carbide tooth accessory). In other embodiments, the front cutting edge portion and its teeth may be formed directly on the body and be composed of the same material as the body.

Example implementations have been provided so that this disclosure will be thorough, and to fully convey the scope to those who are skilled in the art. Numerous specific details are set forth such as examples of specific components, devices, and methods, to provide a thorough understanding of implementations of the present disclosure. It will be apparent to those skilled in the art that specific details need not be employed, that example implementations may be embodied in many different forms and that neither should be construed to limit the scope of the disclosure. In some example implementations, well-known processes, well-known device structures, and well-known technologies are not described in detail.

The terminology used herein is for the purpose of describing particular example implementations only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example implementations.

Terms of degree such as "generally," "substantially," "approximately," and "about" may be used herein when describing the relative positions, sizes, dimensions, or values of various elements, components, regions, layers and/or sections. These terms mean that such relative positions, sizes, dimensions, or values are within the defined range or comparison (e.g., equal or close to equal) with sufficient precision as would be understood by one of ordinary skill in the art in the context of the various elements, components, regions, layers and/or sections being described.

Numerous modifications may be made to the exemplary implementations described above. These and other implementations are within the scope of this application.

What is claimed is:

1. An accessory for use with oscillating power tools comprising:
    an attachment portion configured to be coupled to the oscillating power tool; and
    a working portion defining a rear end portion coupled to the attachment portion and extending along and arranged symmetrically about a tool axis, the working portion including a body bounded at least partially by a front cutting edge with a plurality of teeth opposite the rear end portion, a first lateral edge extending from a first end of the front cutting edge toward the rear end portion, and a second lateral edge opposite the first lateral edge and extending from the front cutting edge toward the rear end portion,
    wherein the working portion is symmetrical about the tool axis at least half a length of the body extending from the rear end portion to the front cutting edge, the front cutting edge is arranged asymmetrically relative to the tool axis with a leading tooth disposed at one end of the cutting edge at a first distance from the rear end portion, a trailing tooth disposed on an opposite end of the cutting edge at a second distance from the rear end portion that is less than the first distance, and a plurality of intermediate teeth disposed between the leading tooth and the trailing tooth, each intermediate tooth disposed less than or equal to the first distance from the rear end portion and greater than or equal to the second distance from the rear end portion, and
    wherein a first reference line connecting tips of the teeth on the cutting edge or tangent lines along a curve connecting tips of the teeth on the cutting edge is slanted at an acute angle to a second reference line that is perpendicular to the tool axis, wherein the acute angle is between 3° and 10°.

2. The accessory of claim 1, wherein the first distance is greater than or equal to a distance from all other teeth to the rear end portion.

3. The accessory of claim 2, wherein the second distance is less than or equal to a distance from all other teeth to the rear end portion.

4. The accessory of claim 1, wherein the cutting edge comprises a plurality of teeth arranged in a convex arc shape along the curve.

5. The accessory of claim 4, wherein the curve has a radius that is centered at a center point on one side of the tool axis.

6. The accessory of claim 5, wherein the center point is disposed axially rearward of the attachment portion.

7. The accessory of claim 4, wherein tangent lines to the curve are disposed at acute angles to the line that is perpendicular to the blade axis X.

8. The accessory of claim 7, wherein the acute angles of the tangent lines progressively increase from the leading tooth to the trailing tooth.

9. The accessory of claim 8, wherein the acute angles of the tangent lines range between 0° and 15°.

10. The accessory of claim 9, wherein an average of the acute angles of the tangent lines is between 3° and 10°.

11. The accessory of claim 9, wherein a tangent line to the curve at a center tooth on the cutting edge that intersects the tool axis is at an acute angle between 3° and 10°.

12. The accessory of claim 1, wherein the cutting edge comprises a plurality of teeth arranged along a straight line disposed at the acute angle.

13. The accessory of claim 1, wherein the body is formed of a first material and the cutting edge is formed as a cutting edge portion composed of a second material that is harder than the first material.

14. The accessory of claim 13, wherein the cutting edge portion is coupled to a front end of the body by welding, brazing, or adhesive.

15. The accessory of claim 13, wherein the first material comprises a first metal and the second material comprises high speed steel, M42 steel, Matrix 2 steel, or a carbide material.

16. The accessory of claim 1, wherein the leading tooth and the trailing tooth each are located a same distance from the tool axis with respect to the second reference line extending perpendicular to the tool axis.

\* \* \* \* \*